United States Patent
Brown

(10) Patent No.: US 10,563,745 B2
(45) Date of Patent: Feb. 18, 2020

(54) STEERING RACK WEAR COMPENSATOR

(71) Applicant: JTEKT AUTOMOTIVE NORTH AMERICA, INC., Plymouth, MI (US)

(72) Inventor: Thomas Brown, Grand Blanc, MI (US)

(73) Assignee: JTEKT AUTOMOTIVE NORTH AMERICA, INC., Plymouth, MI (US)

( * ) Notice: Subject to any disclaimer, the term of this patent is extended or adjusted under 35 U.S.C. 154(b) by 167 days.

(21) Appl. No.: 15/689,822

(22) Filed: Aug. 29, 2017

(65) Prior Publication Data
US 2019/0063581 A1    Feb. 28, 2019

(51) Int. Cl.
*F16H 55/28* (2006.01)
*B62D 3/12* (2006.01)
*F16H 19/04* (2006.01)

(52) U.S. Cl.
CPC .......... *F16H 55/283* (2013.01); *B62D 3/123* (2013.01); *F16H 19/04* (2013.01)

(58) Field of Classification Search
CPC ................. B62D 3/123; Y10T 74/1967; Y10T 74/19623; Y10T 74/19628; F16H 55/283; F16H 2055/281; F16H 55/28; F16H 55/32; F16H 2055/325
USPC .......................................................... 74/409
See application file for complete search history.

(56) References Cited

U.S. PATENT DOCUMENTS

| | | | |
|---|---|---|---|
| 6,145,400 A | 11/2000 | Garza | |
| 7,487,984 B1 | 2/2009 | Lemont, Jr. et al. | |
| 7,930,951 B2 | 4/2011 | Eickholt | |
| 2008/0184830 A1 | 8/2008 | Arlt | |
| 2008/0190229 A1 | 8/2008 | Dodak et al. | |
| 2008/0202271 A1 | 8/2008 | Heo | |
| 2010/0122595 A1 | 5/2010 | Sung et al. | |
| 2011/0193331 A1 | 8/2011 | Heo | |
| 2015/0166098 A1* | 6/2015 | Lingemann | B62D 3/123 74/409 |
| 2016/0052538 A1* | 2/2016 | Taenaka | B62D 3/123 74/109 |

FOREIGN PATENT DOCUMENTS

| | | |
|---|---|---|
| DE | 10 2008 042 134 A1 | 3/2010 |
| DE | 10 2009 046 304 A1 | 5/2011 |
| EP | 1 787 890 A1 | 5/2007 |
| JP | 58-20561 A | 2/1983 |

(Continued)

*Primary Examiner* — Jake Cook
*Assistant Examiner* — Randell J Krug
(74) *Attorney, Agent, or Firm* — Oblon, McClelland, Maier & Neustadt, L.L.P.

(57) ABSTRACT

A wear compensator to compensate wear between a rack and a pinion including a yoke plug, a pin affixed to the yoke plug, jaws that surrounds the pin, a disc spring sandwiched between the yoke plug and the jaws, a stage compensator that receives and slides along the jaws to provide a frictional force, a rack guide in contact with the rack, a spring extending between the stage compensator and the rack guide, wherein when the rack guide transfers to the stage compensator a first load above a predetermined threshold, the frictional force overcomes prevents the spring disc to push the stage compensator towards the rack, and when the rack guide transfers to the stage compensator a second load below the predetermined threshold, the frictional force allows the spring disc to push the stage compensator towards the rack.

15 Claims, 6 Drawing Sheets

(56) References Cited

FOREIGN PATENT DOCUMENTS

| | | |
|---|---|---|
| JP | 61-21672 U | 2/1986 |
| JP | 61-183260 U | 11/1986 |
| JP | 5-50925 A | 3/1993 |
| JP | 6-23871 U | 3/1994 |
| JP | 2004-262335 A | 9/2004 |
| JP | 2007-238089 A | 9/2007 |
| JP | 2008-296899 A | 12/2008 |
| JP | 2010-23772 A | 2/2010 |
| JP | 2010-36610 A | 2/2010 |
| JP | 2010-58689 A | 3/2010 |
| JP | 2010-195278 A | 9/2010 |
| JP | 2011-173466 A | 9/2011 |
| WO | WO 2004/005761 A1 | 1/2004 |
| WO | WO 2010/069942 A1 | 6/2010 |
| WO | WO 2011/018336 A1 | 2/2011 |

* cited by examiner

STEERING RACK WEAR COMPENSATOR

BACKGROUND

Field of the Disclosure

The present disclosure relates to steering systems for vehicles, and particularly to a wear compensator for a rack and pinion articulation.

Description of the Related Art

Most steering systems rely on a rack and pinion articulation to connect directional wheels to a steering wheel to provide control and maneuverability for a vehicle.

Depending and driving conditions, a wide variety of forces can be transmitted throughout the steering system from the directional wheels to the steering wheel, and vice-versa. This wide variety of forces can cause wear and tear in the different connections and articulations present in the steering system and notably in the rack and pinion articulation. This wear and tear can generate unwanted steering sensations such as vibrations and/or rattle noises.

To prevent these unwanted steering sensations from occurring conventional wear compensators that force the rack securely against the pinion shaft gear have been adopted.

Although such conventional wear compensators have been widely used they present important drawbacks in providing appropriate compensations depending on the driving conditions as well as ease of assembling and/or mounting onto the steering system. Notably, these conventional wear compensators can rely on complex designs that rotatively articulate and/or bias a plurality of parts, e.g. rotational cam, and/or torsional spring, together to provide wear compensation. Due to their complex designs and the numerous parts and rotational interactions between these parts, these conventional wear compensators can be cumbersome and/or difficult to assemble and/or to mount onto the steering, systems and be prone to failure. In addition, these conventional wear compensators may not provide a compensation that depends on the driving conditions to enhance steering.

Thus, a wear compensator solving the aforementioned of dependence on driving conditions, ease of assembling, and reliability is desired.

SUMMARY

Accordingly, the object of the present disclosure is to provide a wear compensator of a rack and pinion system which overcomes the above-mentioned limitations.

The wear compensator of the present disclosure maintains steering gear performance over the life of the vehicle by relying on a stage compensator that has a controlled linear motion.

In one non-limiting illustrative example, a rack and pinion system is presented. The rack and pinion system includes a pinion shaft gear, a rack engaged in the pinion shaft gear, a housing that encloses the pinion shaft gear and the rack, and a wear compensator enclosed in the housing and in contact with the rack to compensate wear between the pinion shaft gear and the rack. The wear compensator includes a yoke plug affixed to the housing, a pin affixed to the yoke plug, a plurality of jaws that surrounds the pin, a disc spring sandwiched between the yoke plug and the plurality of jaws to provide a disc spring force between the yoke plug and the plurality of jaws, a stage compensator that receives the plurality of jaws, wherein the stage compensator slides along the jaws to provide between the pin and the jaw a frictional force, a rack guide in contact with the rack, a spring extending between the stage compensator and the rack guide, wherein when the rack guide and the spring transfers from the rack to the stage compensator a first load above a predetermined threshold, the frictional force overcomes the disc spring force and prevents the spring disc to push the stage compensator towards the rack, and when the rack guide and the spring transfers from the rack to the stage compensator a second load below the predetermined threshold, the disc spring force overcomes the frictional force and the spring disc pushes the stage compensator towards the rack.

In one non-limiting illustrative example, a wear compensator for rack and pinion is presented. The wear compensator includes a yoke plug, a pin affixed to the yoke plug, a plurality of jaws that surrounds the pin, a disc spring sandwiched between the yoke plug and the plurality of jaws to provide a disc spring force between the yoke plug and the plurality of jaws; a stage compensator that receives the plurality of jaws, wherein the stage compensator slides along the jaws to provide between the pin and the jaw a frictional force, a rack guide in contact with the rack, a spring extending between the stage compensator and the rack guide, wherein when the rack guide and the spring transfers from the rack to the stage compensator a first load above a predetermined threshold, the frictional force overcomes the disc spring force and prevents the spring disc to push the stage compensator towards the rack, and when the rack guide and the spring transfers from the rack to the stage compensator a second load below the predetermined threshold, the disc spring force overcomes the frictional force and the spring disc pushes the stage compensator towards the rack.

In one non-limiting illustrative example, a method to install a wear compensator into a steering system is presented. The wear compensator includes a yoke plug, a pin affixable to the yoke plug, a stage compensator slidable around the pin, a plurality of jaws slidable in the stage compensator to generate an adjustable frictional force on the pin, a disc spring to generate a disc spring force between the yoke plug and the plurality of jaws, a rack guide to contact a rack of the steering system, and a compression spring to generate a bias force between the rack guide and the stage compensator. The method includes inserting the compression spring inside a cavity of the rack guide, inserting the rack guide with the compression spring into a housing of the rack and pinion system, inserting the disc spring around a pin body of the pin to have the disc spring resting against a pin head of the pin, inserting the plurality of jaws around the pin body, inserting the plurality of jaws and the pin body into a frustum cavity of the stage compensator, inserting the stage compensator, the plurality of jaws, and the pin into the housing to have the stage compensator resting on the compression spring, and inserting the yoke plug into the housing to affix the pin to the yoke plug.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
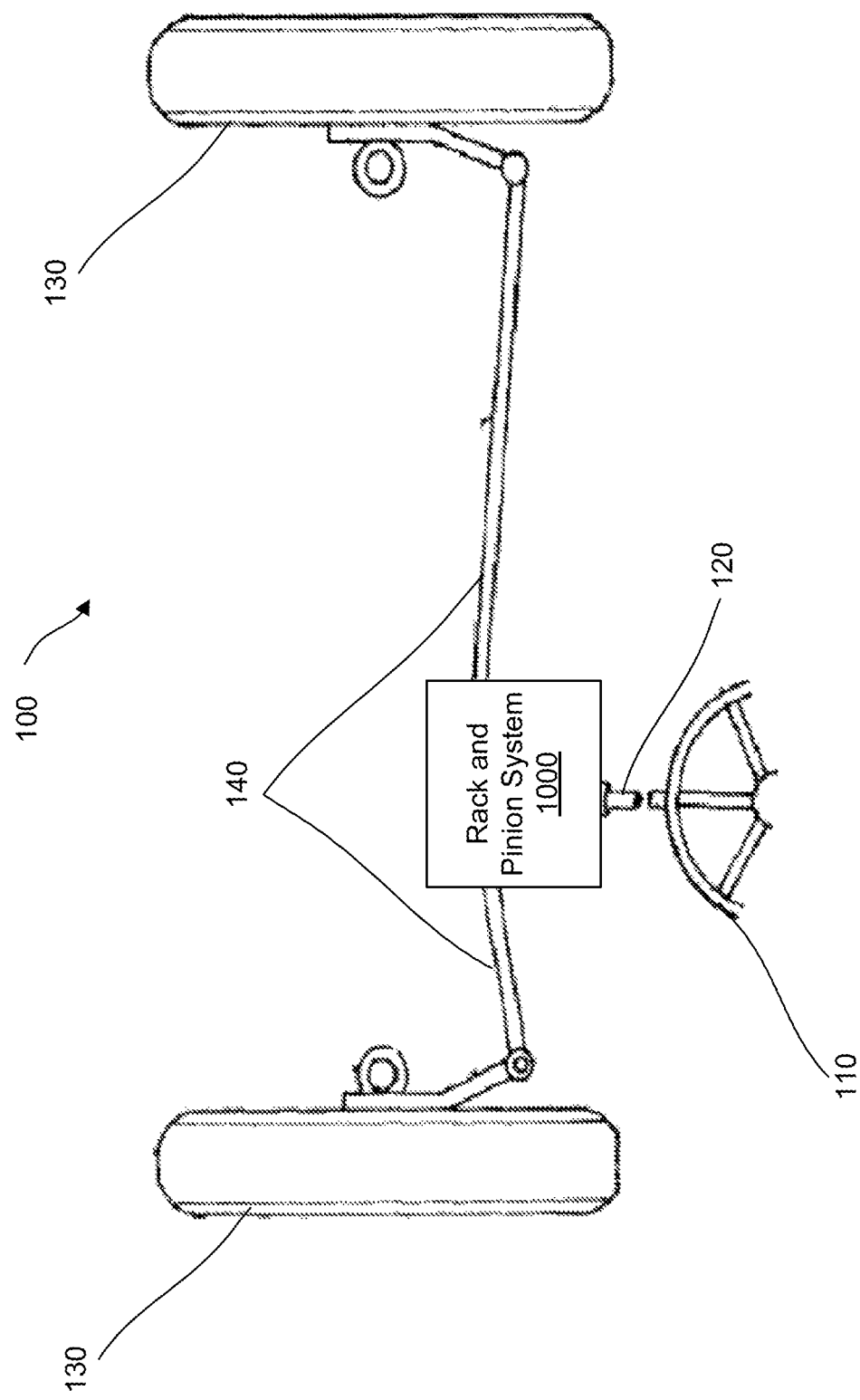
FIG. 1 is a schematic view of a steering system of a vehicle, according to certain aspects of the disclosure.

All publications, patent applications, patents, and other references mentioned herein are incorporated by reference in their entirety. Further, the materials, methods, and examples discussed herein are illustrative only and are not intended to be limiting.

In the drawings, like reference numerals designate identical or corresponding parts throughout the several views. Further, as used herein, the words "a", "an", and the like include a meaning of "one or more", unless stated otherwise. The drawings are generally drawn not to scale unless specified otherwise or illustrating schematic structures or flowcharts.

Figure 2:
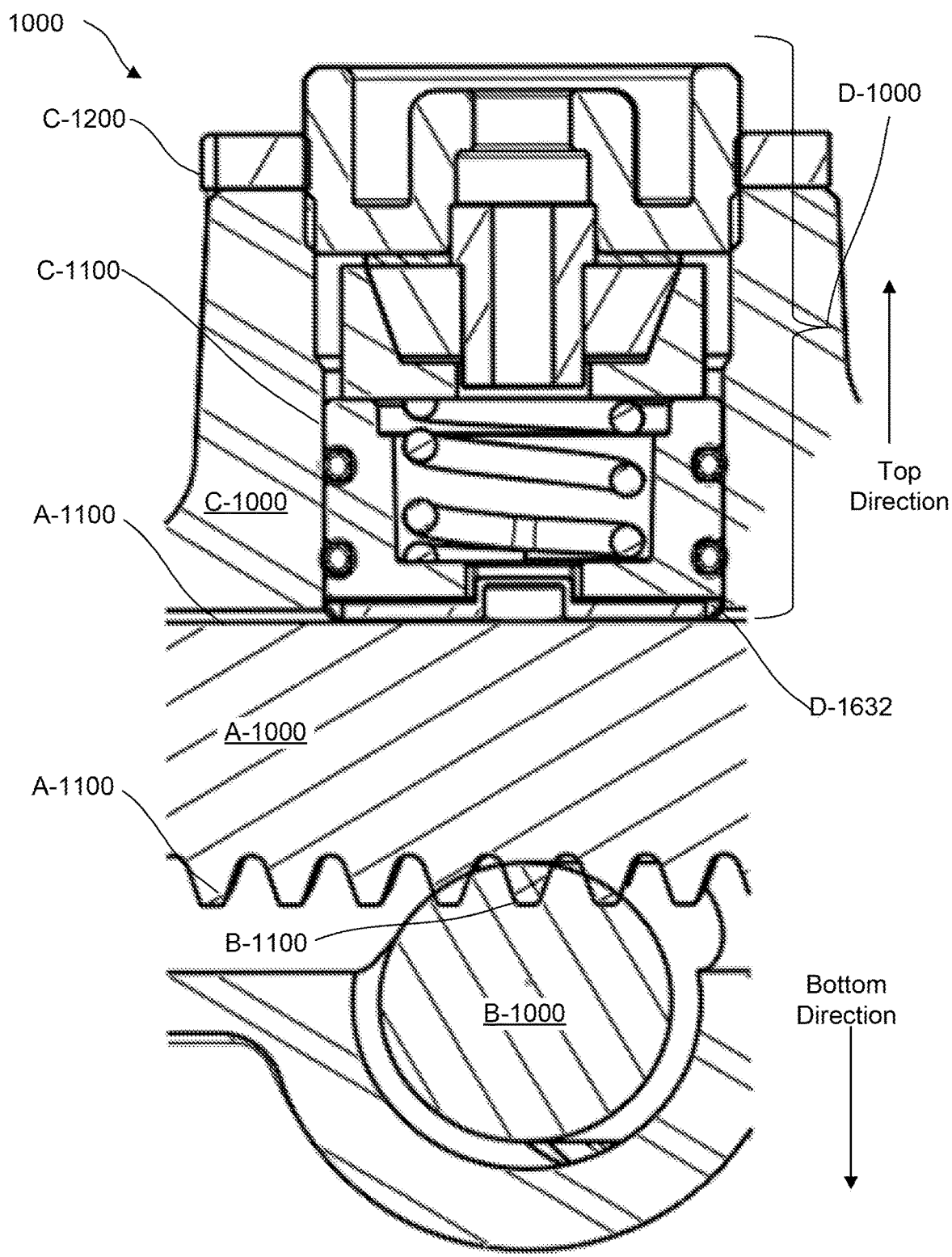
FIG. 2 is a cross sectional view of a rack and pinion system mounted on the steering system, according to certain aspects of the disclosure.

FIGS. 1-2 are a schematic view of a steering system 100 and a cross sectional view of a rack and pinion system 1000 mounted on the steering system 100, according to certain aspects of the disclosure.

The rack and pinion system 1000 can include a rack A-1000 with rack teeth A-1100, a pinion shaft gear B-1000 with pinion teeth B-1100 that mesh with the rack teeth A-1100 of the rack A-1000 the rack A-1000, a housing C-1000 that encloses the rack A-1000, and the pinion shaft gear B-1000 and a rack guide D-1600 that slidably connects of the rack A-1000.

Under the action of an operator, a steering wheel 110 of a vehicle can be articulated, to rotate the pinion shaft gear B-1000, though a steering column 120, and slide, via the rack guide D-1600, the rack A-1000 through the housing C-1000 to articulate wheels 130 of the vehicle through tie rods 140.

In addition, the rack and pinion system 1000 can include a wear compensator D-1000 mounted in the housing C-1000 adjacent to the rack A-1000 and in opposed relation to the pinion shaft gear B-1000.

The wear compensator D-1000 can generate compensation force Fc between the housing C-1000 and the rack A-1000 to press the rack A-1000 against the pinion shaft gear B-1000 and enhance meshing between the rack teeth A-1100 and the pinion teeth B-1100. The wear compensator D-1000 through the compensation force Fc can compensate spacing between the rack A-1000 and the rack guide D-1600 that can appear due to wear and tear of the rack and pinion system 1000 and prevent unwanted steering feel sensations and/or sensations, e.g. abrupt changes, shocks, vibrations, rattle noises, or the like, from occurring.

In addition, the wear compensator D-1000 relies on a limited number of parts with mechanical interactions between each other to facilitate assembling and/or mounting of the wear compensator D-1000 on the rack and pinion system 1000 and provide reliability and robustness for the wear compensator D-1000.

As used herein, the term "bottom" refers to the region of the rack and pinion system 1000 closest to the wheels 130, and the term "top" refers to the region of the rack and pinion system 1000 closest to the steering wheel 110, see arrows in FIG. 2.

Figure 3A:
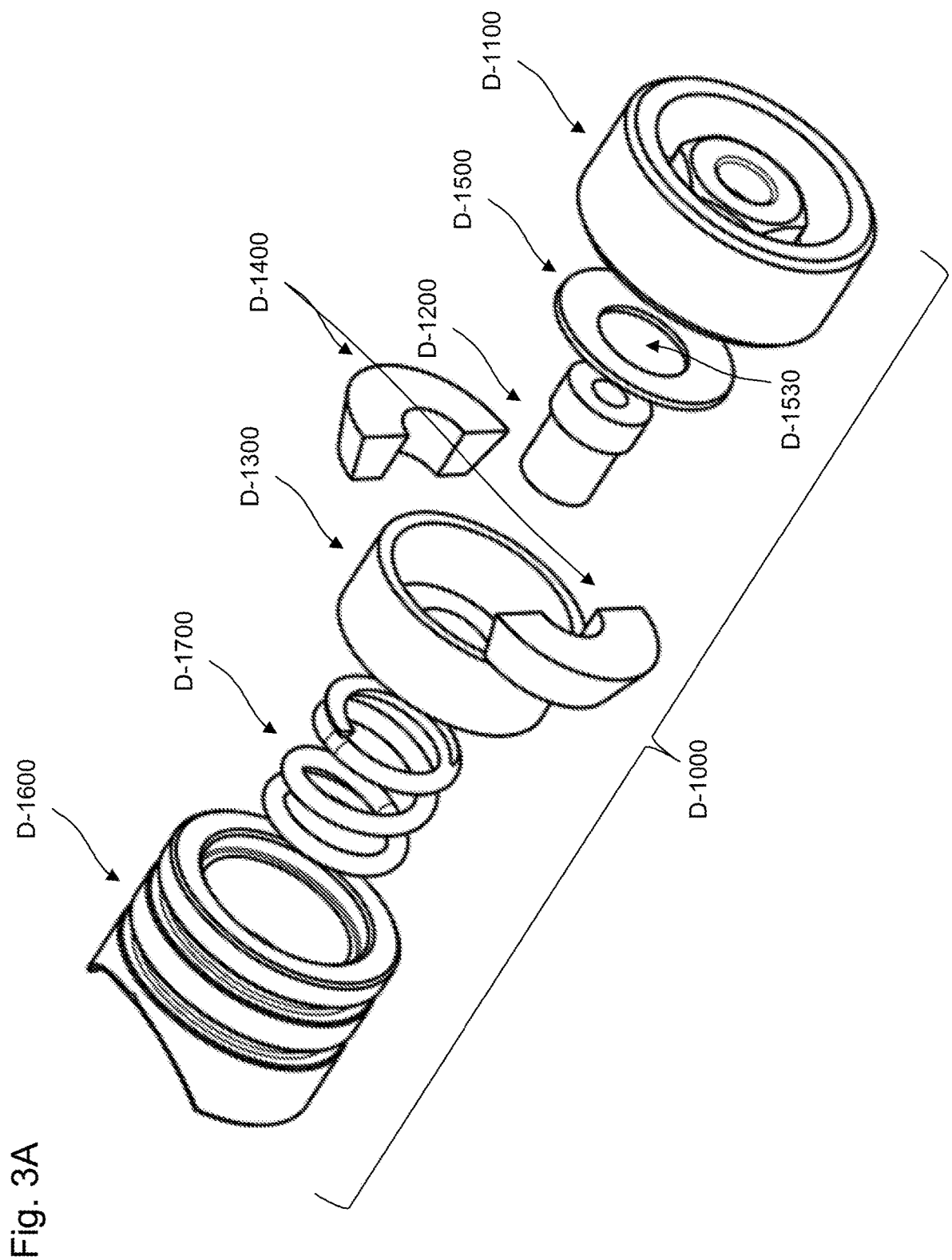
FIG. 3A is an exploded view of a wear compensator of the rack and pinion system, according to certain aspects of the disclosure.
Figure 3B:
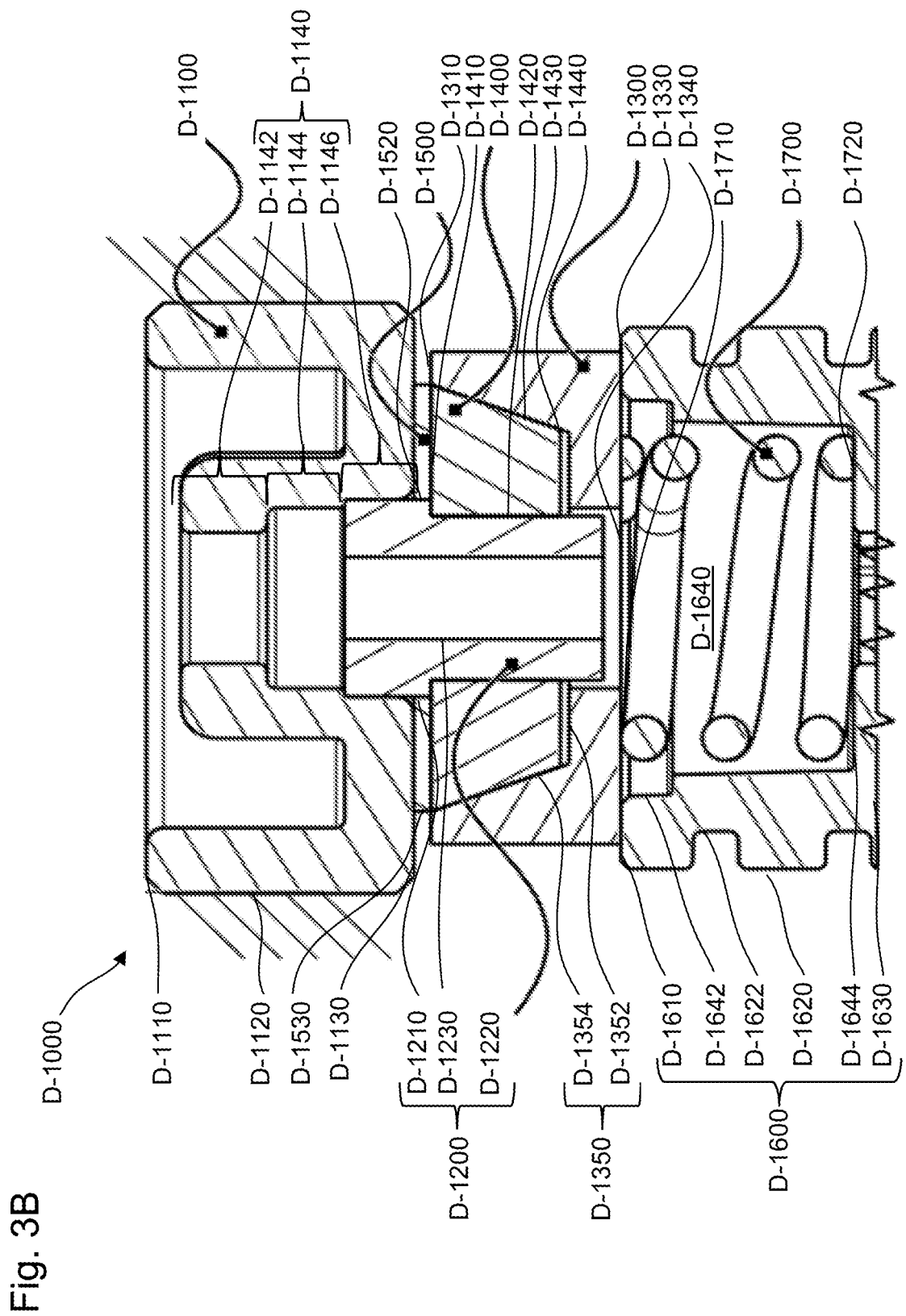
FIG. 3B is a cross sectional view of a wear compensator in a contracted state, according to certain aspects of the disclosure.
Figure 3C:
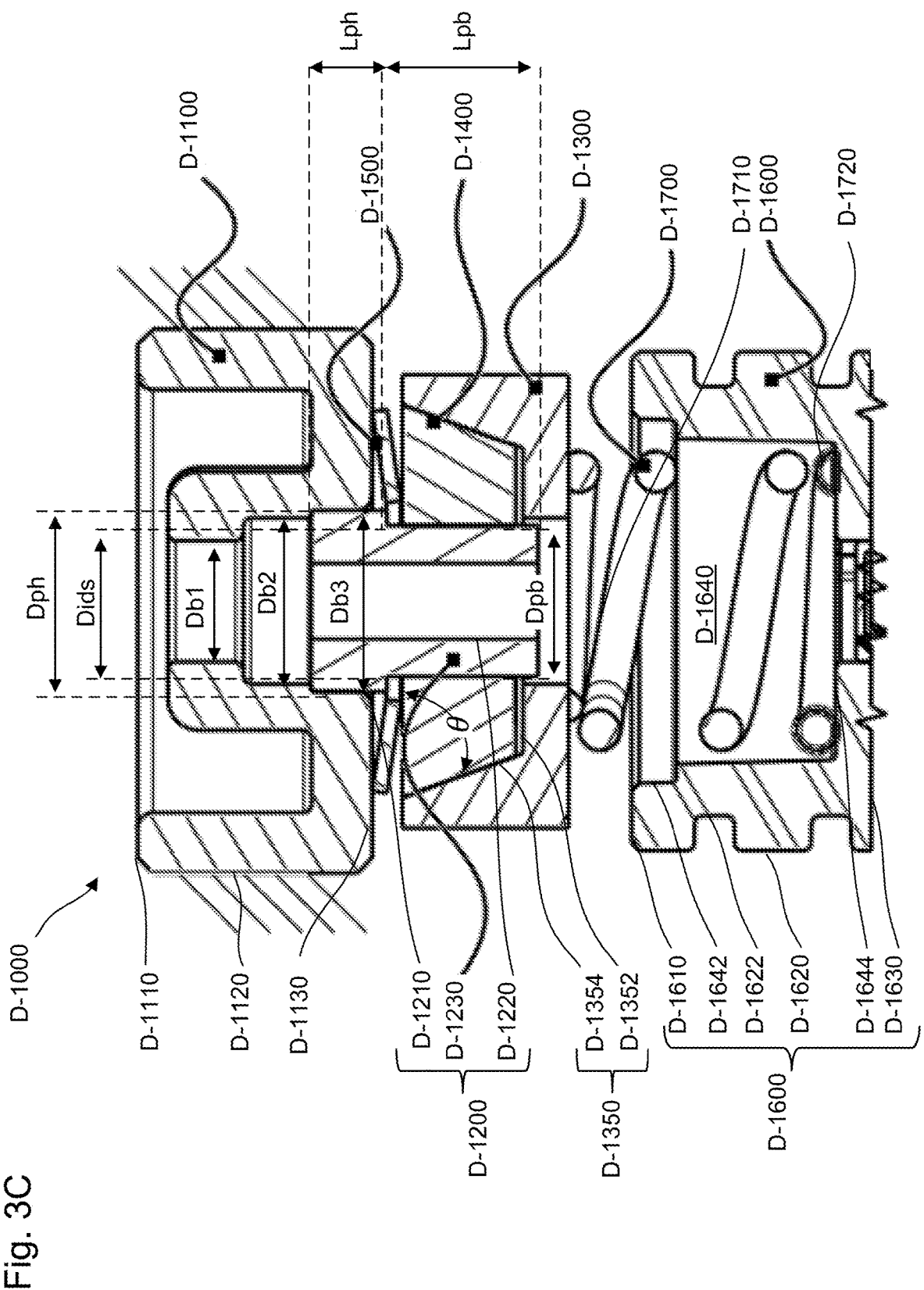
FIG. 3C is a cross sectional view of the wear compensator in an extended state, according to certain aspects of the disclosure.

FIGS. 3A-3C are an exploded view of the wear compensator D-1000, a cross sectional view of the wear compensator D-1000 in a contracted state, and a cross sectional view of the wear compensator D-1000 in an extended state, according to certain aspects of the disclosure.

The wear compensator D-1000 can include a yoke plug D-1100 affixed to the housing top portion C-1200, a pin D-1200 inserted in the yoke plug D-1100, a compensator stage D-1300 inserted around the pin D-1200, jaws D-1400 slidingly inserted around the pin D-1200 and within the compensator stage D-1300, a disc spring D-1500 inserted around the pin D-1200 and between the yoke plug D-1100 and the jaws D-1400, a rack guide D-1600 positioned between the compensator stage D-1300 and a rack top portion A-1200 of the rack A-1000 and between the housing rails C-1100, and a compression spring D-1700 positioned between the rack guide D-1600 and the compensator stage D-1300.

To compensate for the spacing between the pinion teeth B-1200 and the rack teeth A-1100, the wear compensator D-1000 can extend from a fully contracted state, as illustrated in FIG. 3B, to a fully extended state, as illustrated in FIG. 3C, while preventing contraction between the extended state and the contracted state.

In the fully contracted state, the yoke plug D-1100 and the jaws D-1400 can be spaced from each other by a first minimal distance dmin1, the jaws D-1400 can be fully inserted into the compensator stage D-1300, and the rack guide D-1600 and the compensator stage D-1300 can be spaced from each other by a second minimal distance dmin2. The first minimal distance dmin1 can be such that the disc spring D-1500 is fully compressed between the yoke plug D-1100 and the jaws D-1400 and the second minimal distance dmin2 can be such that the compression spring D-1700 is fully compressed between the rack guide D-1600 and the compensator stage D-1300.

In the fully extended state, the yoke plug D-1100 and the jaws D-1400 can be spaced from each other by a first maximal distance dmax1, the jaws D-1400 can be partially inserted into the compensator stage D-1300, and the rack guide D-1600 and the compensator stage D-1300 can be spaced from each other by a second maximal distance dmax2. The first maximal distance dmax1 can be such that the disc spring D-1500 is fully extended between the yoke plug D-1100 and the jaws D-1400 and the second maximal distance dmax2 can be such that the compression spring D-1700 is fully extended between the rack guide D-1600 and the compensator stage D-1300.

The articulation between the fully contracted state and the fully extended state of the wear compensator D-1000 provides a compensation force Fc that depends on different driving conditions that impose different loads onto the rack guide D-1600. For example, extreme loads can be imposed on the rack guide D-1600 when the vehicle is experiencing a sharp turn at high speed or the vehicle goes over road bumps at high speed, while normal loads can be imposed on the rack guide D-1600 when the vehicle is experiencing a moderate turn at moderate speed.

Under normal loads, the appropriate compensation force Fc compensates for wear and tear of the rack and pinion system 1000 by allowing motion of the compensator stage D-1300 along the pin D-1200 and thus allowing the disc spring D-1500 move the compensator stage D-1300 away from the yoke plug D-1100.

Under extreme loads, the appropriate compensation force Fc prevents unwanted steering feel sensations from occurring by blocking motion of the compensator stage D-1300 along the pin D-1200 and preventing the extreme loads to be transfer to the yoke plug D-1100 through the disc spring D-1500. The unwanted steering feel sensations may correspond to abrupt changes of steering sensations, e.g. vibrations and/or shocks.

The yoke plug D-1100 can affix the wear compensator D-1000 to the housing C-1000 by being clamped, welded, and/or fastened through fastening devices, e.g. rivets, screws, bolts, or the like, to the housing top portion C-1200. The disc spring D-1500 can generate a disc spring force Fds between the jaws D-1400 and the yoke plug D-1100.

The jaws D-1400 can generate on the pin D-1200 an adjustable frictional force Faf. The compensator stage D-1300 can slide around the jaws D-1400 and force the jaws D-1400 towards the pin D-1200 or away from the pin D-1200 to increase or decrease the adjustable frictional force Faf exerted on the pin D-1200 by the jaws D-1400, respectively. The rack guide D-1600 can slide along the housing rails C-1100 and push the rack top portion A-1200 against the pinion shaft gear B-1000. The compression spring D-1700 can generate between the compensator stage D-1300 and the rack guide D-1600, a second predetermined bias force f2 that pushes the compensator stage D-1300 around the pin D-1200 and along the housing rails C-1100.

The yoke plug D-1100 can include a yoke top portion D-1110, a yoke bottom portion D-1130 opposite to the yoke top portion D-1110, a yoke wall D-1120 that extends between the yoke top portion D-1110 and the yoke bottom portion D-1130, and a yoke cavity D-1140 that goes through the yoke top portion D-1110 and the yoke top portion D-1130.

The yoke wall D-1120 can have a substantially circular shape and be affixed to the housing top portion C-1200.

The yoke bottom portion D-1130 can face the jaws D-1400 and the compensator stage D-1300 and seat the disc spring D-1500.

The yoke cavity D-1140 can have a first bore D-1142 that opens the yoke top portion D-1110, a third bore D-1146 that opens the yoke bottom portion D-1130 to face the jaws D-1400, and a second bore D-1144 positioned between the first bore D-1142 and the third bore D-1146 and connect the first bore D-1142 to the third bore D-1146. The first bore D-1142, the second bore D-1144, and the third bore D-1146 are placed concentrically between each other.

The first bore D-1142 has a first bore diameter Db1, the second bore D-1144 has a second bore diameter Db2 larger than the first bore diameter Db1, and the third bore D-1146 has a third bore diameter Db3 larger than the second bore diameter Db2.

Alternatively, the yoke plug D-1100 can have different shapes and/or structures to act as a rigid connection between the housing C-1000 and the pin D-1200.

The pin D-1200 can include a pin body D-1220, a pin head D-1210 that surmounts the pin body D-1220, and a pin hole D-1230 that goes through the pin body D-1220 and the pin head D-1210.

The pin head D-1210 can have a cylindrical shape with a pin head diameter Dph and a pin head length Lph while the pin body can have a cylindrical shape with a pin body diameter Dpb smaller than the pin head diameter Dph and a pin body length Lpb longer than the pin head length Lph.

The pin D-1200 can be affixed to the yoke plug D-1100 by having the pin head D-1210 partially inserted in the third bore D-1146. The pin head diameter Dph and the third bore diameter Db3 are such that the pin head D-1210 can be press fitted into the third bore D-1146.

The disc spring D-1500 can include a disc hole D-1510, a disc inner edge D-1520 that defines the disc hole D-1510, and an disc outer edge D-1530 that surrounds the disc inner edge D-1520, wherein the disc spring D-1500 can curve towards the yoke plug D-1100 from the disc inner edge D-1520 to the disc outer edge D-1530 to generate the spring disc force Fsd.

The disc hole D-1510 can have an inner disc spring diameter Dids sufficiently large to receive the pin body D-1220 but sufficiently small to be stopped by the pin head D-1210. For example, the inner disc spring diameter Dids can be larger than the pin body diameter Dpb and smaller than the pin head diameter Dph to sandwiched the disc inner edge D-1520 between the pin head D-1210 and the jaws D-1400 while the disc outer edge D-1530 can slidably contact the yoke bottom portion D-1130.

The disc spring D-1500 can provide a disc spring force Fds on the jaws D-1400 that is substantially constant from the contracted state to the extended stage.

The compensator stage D-1300 can include a compensator top portion D-1310 that faces the yoke bottom portion D-1130, a compensator bottom portion D-1330 that faces the rack top portion A-1200, a compensator hole D-1340 that opens the compensator bottom portion D-1330, and a frustum cavity D-1350 that opens the compensator top portion D-1310 and connects the compensator hole D-1340.

The compensator bottom portion D-1330 can receive a spring top extremity D-1710 of the compression spring D-1700, the frustum cavity D-1350 can receive the pin body D-1220 surrounded by the jaws D-1400, and the compensator hole D-1340 can partially receive the pin body D-1220.

The frustum cavity D-1350 can have a compensator stop D-1352 that delimits the compensator hole D-1340 and a conical wall D-1354 that narrows from the compensator top portion D-1310 to the compensator stop D-1352.

The conical wall D-1354 can narrow from the compensator top portion D-1310 to the compensator stop D-1352 with a predetermined angle θ to allow the adjustable frictional force Faf to be modified from a minimum frictional value Fafmin to a maximum frictional value Fafmax as the conical wall D-1354 slides along the jaws D-1400, wherein the minimum frictional value Fafmin is lower than the disc spring force Fds and the maximum frictional value Fafmax is higher than the disc spring force Fds.

Each jaw of the jaws D-1400 can include a jaw top portion D-1410 that faces the yoke bottom portion D-1130 and contact the disc inner edge D-1520, a jaw bottom portion D-1440 opposite to the jaw top portion D-1410 that faces the compensator stop D-1352, a jaw inner wall D-1420 in contact with the pin body D-1220 and extending between the jaw top portion D-1410 and the jaw bottom portion D-1440, and a jaw outer wall D-1430 in contact with the conical wall D-1354 of the compensator stage D-1300 and extending between the jaw top portion D-1410 and the jaw bottom portion D-1440.

The jaw top portion D-1410 can have a semi-annular shape to provide sufficient support for the disc inner edge D-1520 that is sandwiched between the pin head D-1210 and the jaw top portion D-1410 while the jaw bottom portion D-1440 can have a semi-annular shape to provide sufficient support from the compensator stop D-1352.

The jaw outer wall D-1430 can have a semi-cylindrical shape to match the conical wall D-1354 of the compensator stage D-1300 and allow the jaw outer wall D-1430 to slide along the conical wall D-1354. The jaw inner wall D-1420 can have a semi-cylindrical shape to match the pin body D-1220 and generate the adjustable frictional force Faf that increases or decreases friction between the pin D-1200 and the jaw D-1400 as the jaw outer wall D-1430 slides along the conical wall D-1354 towards the compensator top portion D-1310 or towards the compensator stop D-1352.

In addition, the jaw outer wall D-1430 and/or the conical wall D-1354 of the compensator stage D-1300 can have topologies and/or surface finishing to provide a first friction coefficient k1 that allows sliding between the jaws D-1400 and the compensator stage D-1300, while the jaw inner wall D-1440 and the pin body D-1220 can have topologies and/or surface finishing to provide a second friction coefficient k2 higher than the first friction coefficient k1 that allows clamping between the jaws D-1400 and the pin D-1200. The clamping between the jaws D-1400 and the pin D-1200 and prevent the compensator stage D-1300 to slide towards the yoke plug D-1100 and the disc spring D-1500 to be compressed against the yoke bottom portion D-1130.

The rack guide D-1600 can include a rack guide top portion D-1610 that faces the compensator bottom portion D-1330, a rack guide bottom portion D-1630 opposite to the rack guide top portion D-1610 that contacts the rack top portion A-1200 of the rack A-1000, a rack guide wall D-1620 that extends between the rack guide top portion D-1610 and the rack guide bottom portion D-1630 and is slidably in contact with the housing rails C-1100 of the housing C-1000, see FIG. 2, and a rack guide cavity D-1640 that opens the rack guide top portion D-1610.

The rack guide bottom portion D-1630 can have a shoe D-1632 in contact with the rack top portion A-1200 to provide slidable contact between the rack A-1000 and the rack guide D-1600, see FIG. 2.

The rack guide wall D-1620 can have a plurality of seal recesses D-1622 placed along a length of the rack guide wall D-1620 to prevent impurities, e.g. dust, metal debris and/particles, from entering the wear compensator D-1000 and impede the articulation of the wear compensator D-1000.

The rack guide cavity D-1640 can have a rack guide top opening D-1642 that faces the compensator bottom portion D-1330 and allow the spring top extremity D-1710 of the compression spring D-1700 to protrude from the rack guide cavity D-1640 and a rack guide seat D-1644 opposite to the rack guide opening D-1642 that provides to a spring bottom extremity D-1720 of the compression spring D-1700 support.

When the load imposed on the rack guide D-1600 is reduced from the extreme load to the normal load, the conical wall D-1314 can slide along the jaw outer wall D-1430 towards the rack A-1000. The sliding of the compensator stage D-1300 towards the rack A-1000 can decrease clamping exerted by the jaw inner wall D-1420 onto the pin body D-1220 due to the first friction coefficient k1 between the jaws D-1400 and the compensator stage D-1300 being lower than the second friction coefficient k2 between the jaw D-1400 and the pin D-1200. The decrease of the clamping exerted by the jaws D-1400 onto the pin D-1200 can lower the adjustable frictional force Faf from the maximum frictional value Fafmax to the minimum frictional value Fafmin for which the spring disc force Fsd can overcome the adjustable frictional force Faf. Overcoming the adjustable frictional force Faf by the spring disc force Fsd can allow the jaw top portion D-1410 to be pushed away from the yoke bottom portion D-1130 by the disc spring D-1500. The pushing of the jaws D-1400 by the disc spring D-1500 can slide the compensator stage D-1300 along the pin body D-1220 and the compensator bottom portion D-1330 can compress the compression spring D-1700. The compression of the compression spring D-1700 can push the rack guide bottom portion D-1630 against the rack A-1000 to compensate spacing between the rack teeth A-1100 and pinion teeth B-1200 due to wear and tear.

When the load imposed on the rack guide D-1600 is increased from the normal load to the extreme load, the conical wall D-1314 can slide along the jaw outer wall D-1430 towards the yoke plug D-1100. The sliding of the compensator stage D-1300 towards the yoke plug D-1100 can increase clamping exerted by the jaw inner wall D-1420 onto the pin body D-1220 due to the second friction coefficient k2 between the jaws D-1400 and the pin D-1200 being higher than the first friction coefficient k1 between the jaws D-1400 and the compensator stage D-1300. The increase of the clamping exerted by the jaws D-1400 onto the pin D-1200 can increase the adjustable frictional force Faf from the minimum frictional value Fafmin to the maximum frictional value Fafmax for which the spring disc force Fsd fails to overcome the adjustable frictional force Faf. The failure to overcome of the adjustable frictional force Faf by the spring disc force Fsd can block the jaws D-1400 and the compensator stage D-1300 from sliding towards the yoke plug D-1100. The blockage of the compensator stage D-1300 can prevent unwanted steering sensations from occurring.

Figure 4:
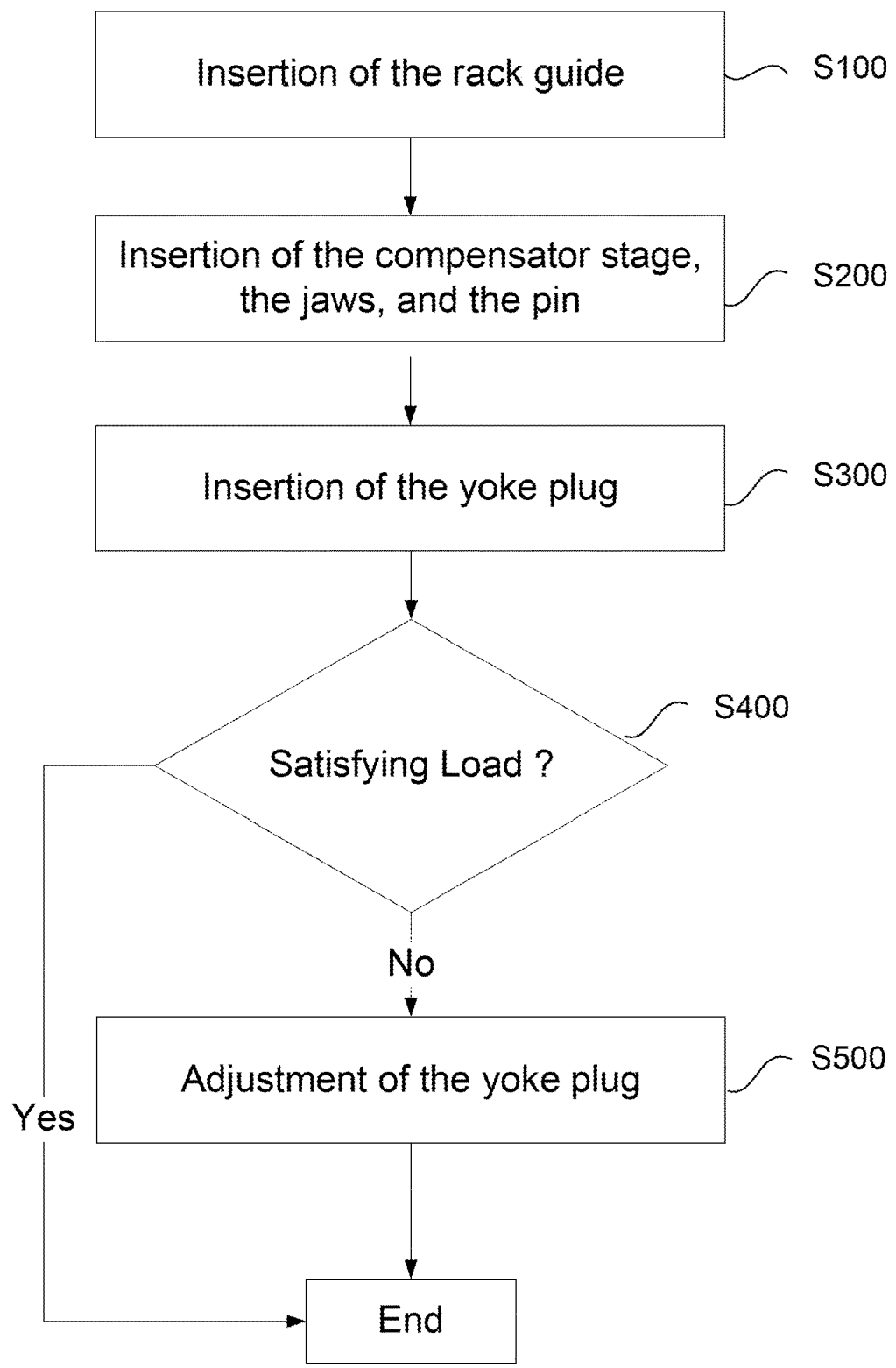
FIG. 4 is a flow chart of a method for installing the wear compensator into the rack and pinion system, according to certain aspects of the disclosure.

FIG. 4 is a flow chart of a method for installing the wear compensator D-1000 into the rack and pinion system 1000, according to certain aspects of the disclosure.

In a step S100, the rack guide D-1600 with the compression spring D-1700 placed into the rack guide cavity D-1640 can be inserted into the housing C-1000 to have the shoe D-1642 in contact with the rack top portion C-1200.

In a step S200, the compensator stage D-1300, the jaws D-1400, the pin D-1200 with the disc spring D-1500 placed around the pin body D-1220, one by one or all together, can be inserted into the housing C-1000 by being placed between the compression spring D-1700 and the housing top portion C-1200.

In a step S300, the yoke plug D-1100 can be inserted into the housing C-1000 with a predetermined insertion force Fi above the maximum frictional value Fafmax of the adjustable frictional force Faf to press fit the pin D-1200 into the yoke plug D-1100 and to compress the disc spring D-1500. The pin D-1200 can be press fitted into the yoke plug D-1100 by having the pin head D-1210 inserted with the predetermined insertion force Fi into the third bore D-1146 of the yoke plug D-1100. The disc spring D-1210 can be compressed by having the disc inner edge D-1520 sandwiched between the pin head D-1210 and the jaw top portion D-1410.

In a step S400, it is verify that the wear compensator D-1000 has been inserted with a satisfying load, e.g. a load exerted by the wear compensator D-1000 on the rack A-1000 that is large enough to compensate wear but small enough to prevent damage the rack and pinion system 1000 from occurring. The verification that the wear compensator D-1000 has been inserted with a satisfying load can be performed by inspection through the pin hole D-1230.

If it is determined that the wear compensator D-1000 has been inserted with the satisfying load, the installation process of the wear compensator D-1000 is ended. Otherwise, the process goes to a step S500.

In the step S500, the insertion of yoke plug D-1100 into the housing C-1000 can be adjusted to reduce or increase the load exerted by the wear compensator D-1000 on the rack A-1000. For example, the yoke plug D-1100 can be pulled out along the top direction or push in along the bottom direction to reduce or increase the compression on the disc spring D-1500, respectively.

The foregoing discussion discloses and describes merely exemplary embodiments of an object of the present disclosure. As will be understood by those skilled in the art, an object of the present disclosure may be embodied in other specific forms without departing from the spirit or essential characteristics thereof. Accordingly, the present disclosure is intended to be illustrative, but not limiting of the scope of an object of the present disclosure as well as the claims.

Numerous modifications and variations on the present disclosure are possible in light of the above teachings. It is therefore to be understood that within the scope of the appended claims, the disclosure may be practiced otherwise than as specifically described herein.

What is claimed is:

1. A wear compensator in contact with a rack engaged with a pinion shaft gear of a vehicle to compensate wear between the pinion shaft gear and the rack, comprising:
   a plurality of jaws;
   a spring sandwiched between a support structure of the wear compensator and the plurality of jaws to provide a bias force;
   a stage compensator that slides along the plurality of jaws to provide between the support structure and the plurality of jaws a frictional force, wherein
   when a rack guide transfers to the stage compensator a first load above a predetermined threshold, the frictional force overcomes the bias force and prevents the spring from pushing the stage compensator towards the rack, and
   when the rack guide transfers to the stage compensator a second load below the predetermined threshold, the bias force overcomes the frictional force and the spring pushes the stage compensator towards the rack.

2. The compensator of claim 1, wherein the stage compensator includes a cavity with a wall and each jaw of the plurality of jaws has a jaw outer wall that matches a surface of the wall.

3. The compensator of claim 2, wherein each jaw has a jaw inner wall that matches a surface of the support structure.

4. The compensator of claim 3, wherein a first friction coefficient is exerted between each jaw inner wall and the corresponding surface of the support structure and a second friction coefficient lower than the first friction coefficient is exerted between each jaw outer wall and the corresponding wall of the stage compensator.

5. The compensator of claim 3, wherein each jaw inner wall has a first surface finishing and each jaw outer wall has a second surface finishing smoother than the first surface finishing.

6. The compensator of claim 5, wherein the plurality of jaws includes a pair of jaws substantially identical from each other.

7. The compensator of claim 1, wherein the support structure includes a yoke plug and a pin affixed to the yoke plug.

8. The compensator of claim 7, wherein the pin has a pin head inserted into a bore of the yoke plug.

9. The compensator of claim 8, wherein the spring is a disc spring positioned around a pin body of the pin.

10. The compensator of claim 9, wherein the disc spring has a disc inner edge sandwiched between the pin head and the jaws.

11. The compensator of claim 10, wherein the jaws have a top part in contact with the disc inner edge.

12. The compensator of claim 9, wherein the disc spring has a disc outer edge that slidably contacts a yoke bottom portion of the yoke plug.

13. A method to install a wear compensator into a steering system, the wear compensator including a yoke plug, a pin affixable to the yoke plug, a stage compensator slidable around the pin, a plurality of jaws slidable in the stage compensator to generate an adjustable frictional force on the pin, a disc spring to generate a disc spring force between the yoke plug and the plurality of jaws, a rack guide to contact a rack of the steering system, and a compression spring to generate a bias force between the rack guide and the stage compensator, the method comprising:
    inserting the compression spring inside a cavity of the rack guide;
    inserting the rack guide with the compression spring into a housing of the steering system;
    inserting the disc spring around a pin body of the pin to have the disc spring resting against a pin head of the pin;
    inserting the plurality of jaws around the pin body;
    inserting the plurality of jaws and the pin body into a frustum cavity of the stage compensator;
    inserting the stage compensator, the plurality of jaws, and the pin into the housing to have the stage compensator resting on the compression spring; and
    inserting the yoke plug into the housing to affix the pin to the yoke plug.

14. The method of claim 13, further including verifying that the wear compensator is inserted.

15. The method of claim 14, wherein inserting the yoke further include press fitting the pin head into a bore of the yoke plug.

* * * * *